(12) United States Patent
Mullins (10) Patent No.: US 8,215,587 B2
(45) Date of Patent: Jul. 10, 2012

(54) PARACHUTE WITH ONE-WAY VALVE DEVICE

(76) Inventor: Charles Michael Mullins, Germantown, TN (US)

(*) Notice: Subject to any disclaimer, the term of this patent is extended or adjusted under 35 U.S.C. 154(b) by 179 days.

(21) Appl. No.: 12/767,441

(22) Filed: Apr. 26, 2010

(65) Prior Publication Data

US 2011/0260004 A1    Oct. 27, 2011

(51) Int. Cl.
*B64D 17/00* (2006.01)

(52) U.S. Cl. .............. 244/146; 244/900; 244/123.11

(58) Field of Classification Search .......... 244/146, 244/900, 902, 145, 123.11
See application file for complete search history.

(56) References Cited

U.S. PATENT DOCUMENTS

| | | | |
|---|---|---|---|
| 3,558,087 A | | 1/1971 | Barish |
| 3,749,337 A | * | 7/1973 | Jalbert .................. 244/145 |
| RE31,205 E | | 4/1983 | Jalbert |
| 4,771,970 A | * | 9/1988 | Sutton .................. 244/145 |
| 4,811,920 A | | 3/1989 | Askwith |
| 4,930,728 A | | 6/1990 | Wittington |
| 5,174,529 A | | 12/1992 | Jalbert |
| 5,201,482 A | | 4/1993 | Ream |
| 5,573,207 A | * | 11/1996 | Germain ............... 244/145 |
| 5,967,463 A | | 10/1999 | Payne |
| 2003/0132348 A1 | | 7/2003 | Lynn |

* cited by examiner

*Primary Examiner* — J. Woodow Eldred
(74) *Attorney, Agent, or Firm* — John Steckler Schwab (57) ABSTRACT

A multi-celled ram-air parachute possessing one or more internal one-way valved air passages between at least two parachute cells to maintain positive air pressure within the parachute for the purpose of maintaining shape and rigidity when less than optimal airspeed is present thereby increasing a user's control and safety.

21 Claims, 10 Drawing Sheets

PARACHUTE WITH ONE-WAY VALVE DEVICE

BACKGROUND OF THE INVENTION

This invention relates generally to parachutes and paragliders. More particularly, it relates to ram-air type parachutes and paragliders that include a plurality of cells with at least one valve in at least one of the cells to inhibit deformation of the air wing structure.

Much like an airplane wing, a ram-air parachute possesses an airfoil that provides lift and allows the operator to control the direction, speed and rate of descent. The shape and rigidity of a parachute determine such flight characteristics. Generally, a ram-air parachute consists of an upper surface and a lower surface connected by a plurality of vertically attached ribs. A cell of the parachute is the part of the parachute between the upper and lower skins bordered by a rib on one side and an adjacent rib on the other. Much like an airplane wing, one of the purposes of these ribs is to help the wing to keep its shape and strength. Load bearing ribs support and distribute the weight of the user by bearing forces of the lines connecting the user to the parachute.

Generally a parachute has lightning holes cut into the ribs to reduce its packed bulk and keep it evenly pressurized when inflated. The holes in the ribs of a parachute are called crossports and allow the air to communicate or move from higher pressurized cells to lower pressurized cells. The parachute is pressurized by high pressure air entering inlets along the leading edge of the parachute. Some parachutes possess internal cross braces, usually in the form of diagonal pieces of fabric connecting the top of one rib to the bottom of an adjacent rib. These cross braces provide additional support to the canopy and maximize the surface area of the parachute.

What keeps a traditional ram-air parachute pressurized, therefore, is the constant flow of air into or against the air inlets of the parachute. On a normal ram-air parachute more airflow means more rigidity and less airflow means less rigidity, less airflow also means the parachute will shrink in size. The reason the ram-air parachute looses rigidity and size with less airflow is due to air spilling out of the leading edge. Loss of parachute rigidity occurs when the parachute is slowed for landing and can also occur when flying in turbulent air.

Operators generally will select a parachute that matches their skill level and desired performance characteristics. Performance generally increases as the parachute size is reduced, allowing the operator to fly a faster, more responsive parachute. When the parachute is slowed for landing, however, the parachute looses rigidity and shrinks further in size, reducing lift and increasing the stall speed of the parachute. In order to land safely, an operator must select a parachute having a sufficiently large surface area to ensure a safe landing speed, while possessing a small enough surface area so that the parachute possesses the desired performance characteristics.

Reduced stall speed during slow landings due to loss of rigidity and shrinkage is one problem associated with ram air inflated parachutes. Loss of rigidity may ultimately lead, however, to the parachute canopy collapsing which can lead to injury or death of the user. Should the canopy be allowed to lose sufficient rigidity, the parachute may collapse and greatly increase the vertical descent of the operator. Landing is a particular vulnerable time for the parachute user, where slow speed, ground induced turbulence and reduced recovery time increase the risk of canopy collapse.

In order to increase maneuverability, reduce the stall speed and increase safety, it is desirable for a parachute to maintain a positive pressure within the majority of cells. It is especially important when encountering slow speed conditions or turbulence. It is also desirable for the parachute to maintain rigidity and maximum lift capacity during slow speed maneuvers such as landing allowing the operator to select and safely fly smaller parachutes for increased performance.

BRIEF SUMMARY OF THE INVENTION

The invention disclosed herein maintains the rigidity and shape of a ram-air parachute when air pressure against the air inlets of the parachute provides inadequate pressurization. Generally this is accomplished by closing off the air inlets on one or more cells and turning one or more of the crossports into one-way valves. Valving can be accomplished by partially sewing a panel of material, such as zero-porosity or low-porosity parachute material, over the crossport. When pressure is lower on the side of the crossport where the valve panel is attached, air is allowed to flow through the crossport to pressurize that cell and any other cells in communication with that cell. However when air pressure is higher in the cell on the side of the crossport where the valve panel is attached than the other side of the crossport, the airflow is reversed and the valve panel is urged against the rib material surrounding the crossport creating a seal preventing depressurization of the parachute.

Partial attachment of the valve panel to the rib material prevents the valve from being forced through the crossport. In another embodiment the valved crossports possess a breathable mesh material attached over the opening of the crossports. In such embodiment the mesh material prevents the valve material from passing through the crossport. By positioning the valved crossports within the ribs of the parachute, an airlock designed parachute can be achieved that also possess the additional stabilizing effects of cross bracing.

The resulting parachute provides reduced stall speeds at slow speeds. Slower stall speeds allow the user to select a smaller parachute for increased performance characteristics while providing a larger canopy area at landing than what could be achieved with a parachute otherwise lacking one-way valves. The resulting parachute also increases stability in turbulent or low speed conditions, increasing the user's safety and generally providing for a more enjoyable experience.

BRIEF DESCRIPTION OF THE DRAWINGS

The invention is illustrated by the accompanying drawings, in which.

DETAILED DESCRIPTION OF THE INVENTION

The drawings illustrate an invention that enables a parachute to retain its rigidity and shape when flying in turbulent air or at low speeds.

Figure 1:
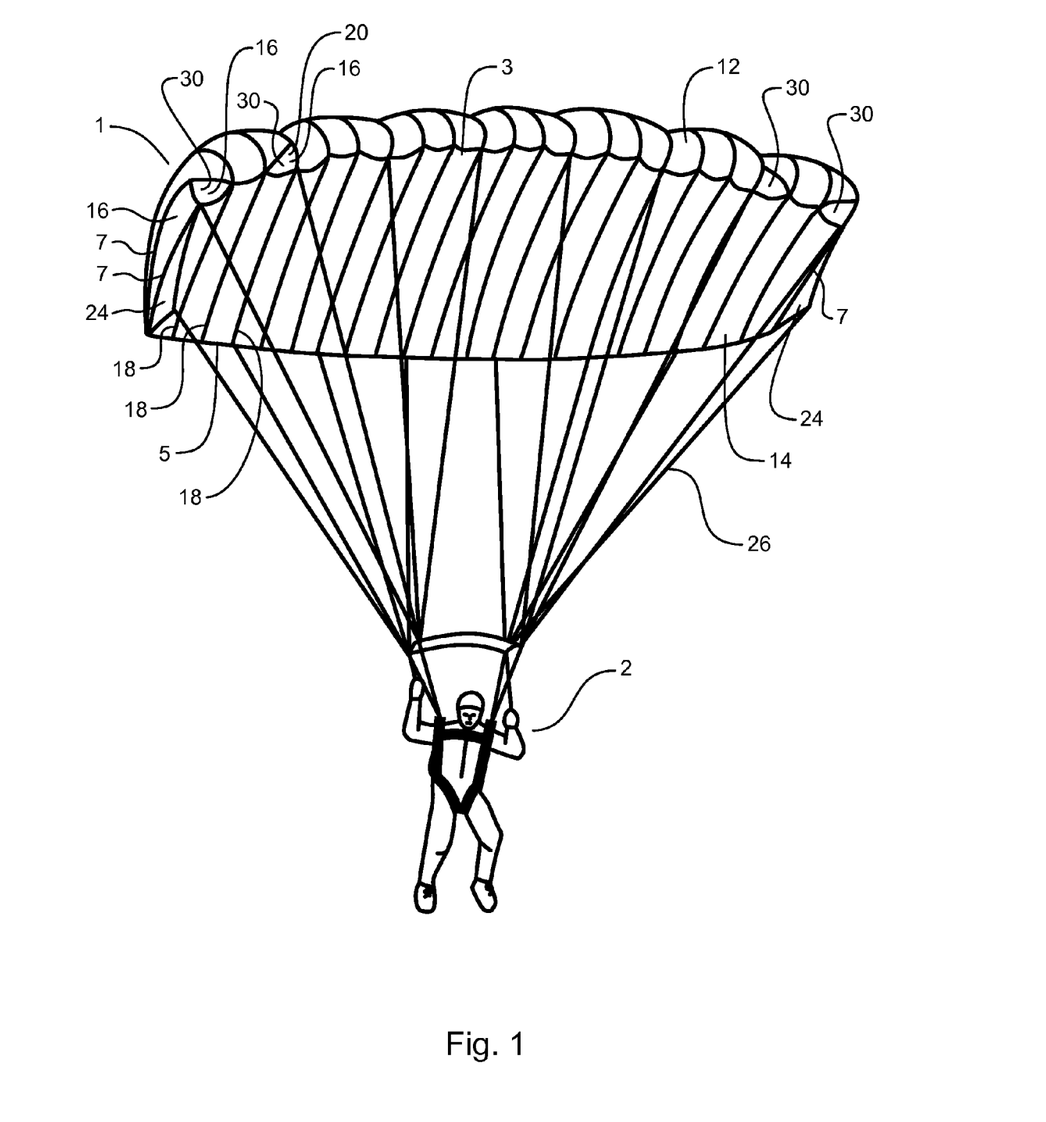
FIG. 1 is a front perspective view of the invention showing outboard positioned air inlets.

FIG. 1 shows one embodiment of the present invention 1 employed as a parachute and deployed and inflated in flight. The parachute 1 is comprised of a an upper skin 12 of a generally rectangular shape and a lower skin 14 of substantially the same configuration each having a leading edge 3 a trailing edge 5 and a pair of generally opposing lateral edges 7. The lower skin 14 is disposed beneath and joined to the upper skin 12 at the trailing edge 5, the leading edge 3 and by a plurality of elongated rib members 16. The joining of the rib members 16 in the present embodiment can be seen in FIG. 1 as parallel seam lines 18. Load bearing ribs 20 bear and distribute the weight of the payload such as an operator 2, suspended beneath the parachute 1. Generally, suspension lines 26 connect to, or proximately to a load bearing rib 20 that in turn distribute the tensile forces to the upper skin 12 and lower skin 14. Suspension lines 26 may also be connected to stabilizers 24. In this embodiment a plurality of air inlets 30 are positioned on the outboard leading edge 3 portion of the parachute 1. The remaining portions of the leading edge 3 of the parachute 1 are closed to allow air entering the air inlets 30 to inflate the volume between the upper and lower skins 12, 14. During deployment of the parachute 1, air enters the air inlet 30 and flows toward the center of the parachute 1 inflating it. After inflation, airflow within the parachute 1 slows, and pressure from air flowing against the air inlet 30 maintains the parachute's inflated state.

Figure 2:
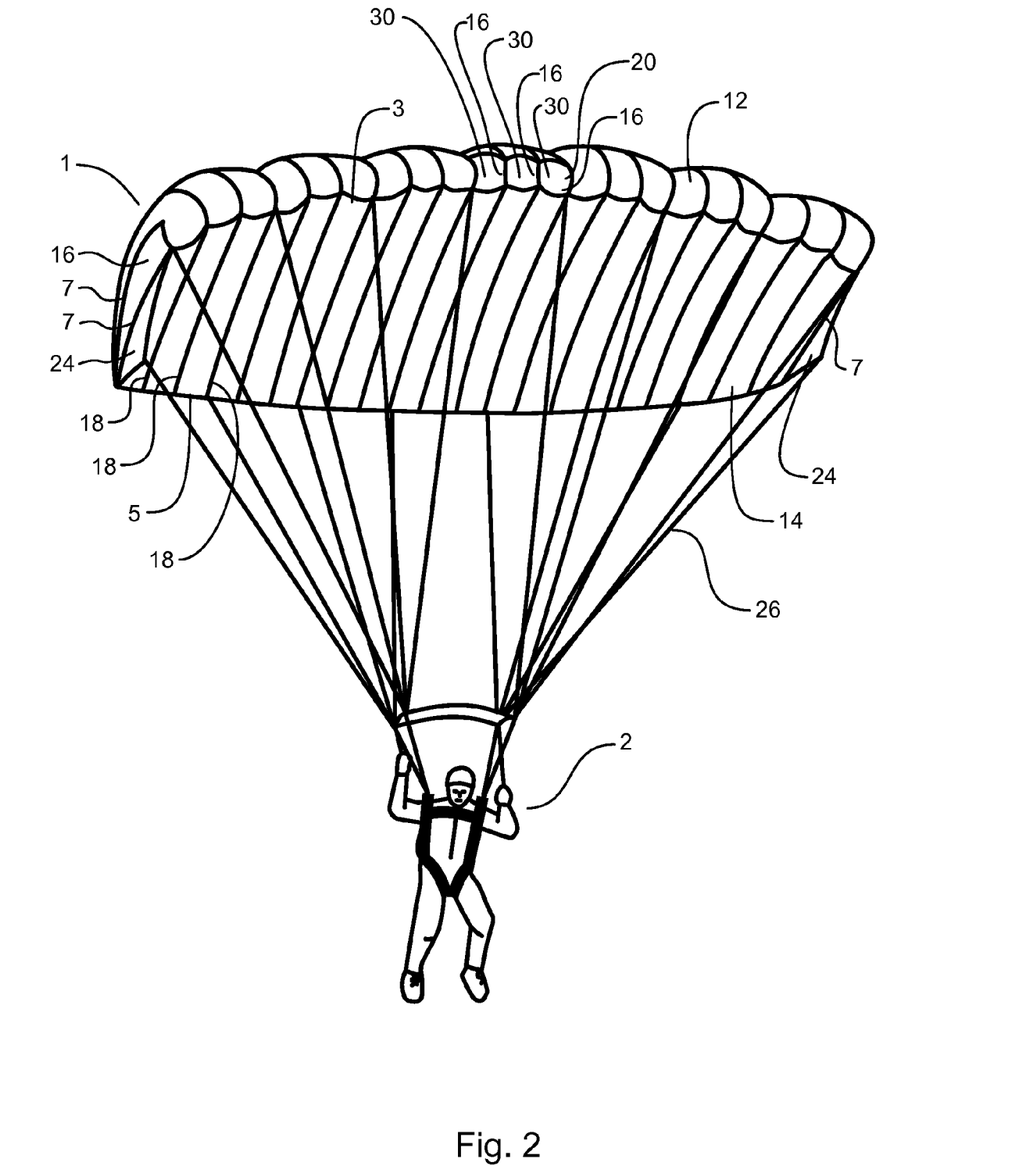
FIG. 2 is a front perspective view of the invention showing air inlets positioned in the center cell of the parachute.

FIG. 2 illustrates an alternative embodiment of the current invention where the air inlets 30 are positioned in the center or inboard section of the parachute 1. In this embodiment, air flows in through the center air inlets 30 toward the outboard portions of the parachute 1.

Figure 3:
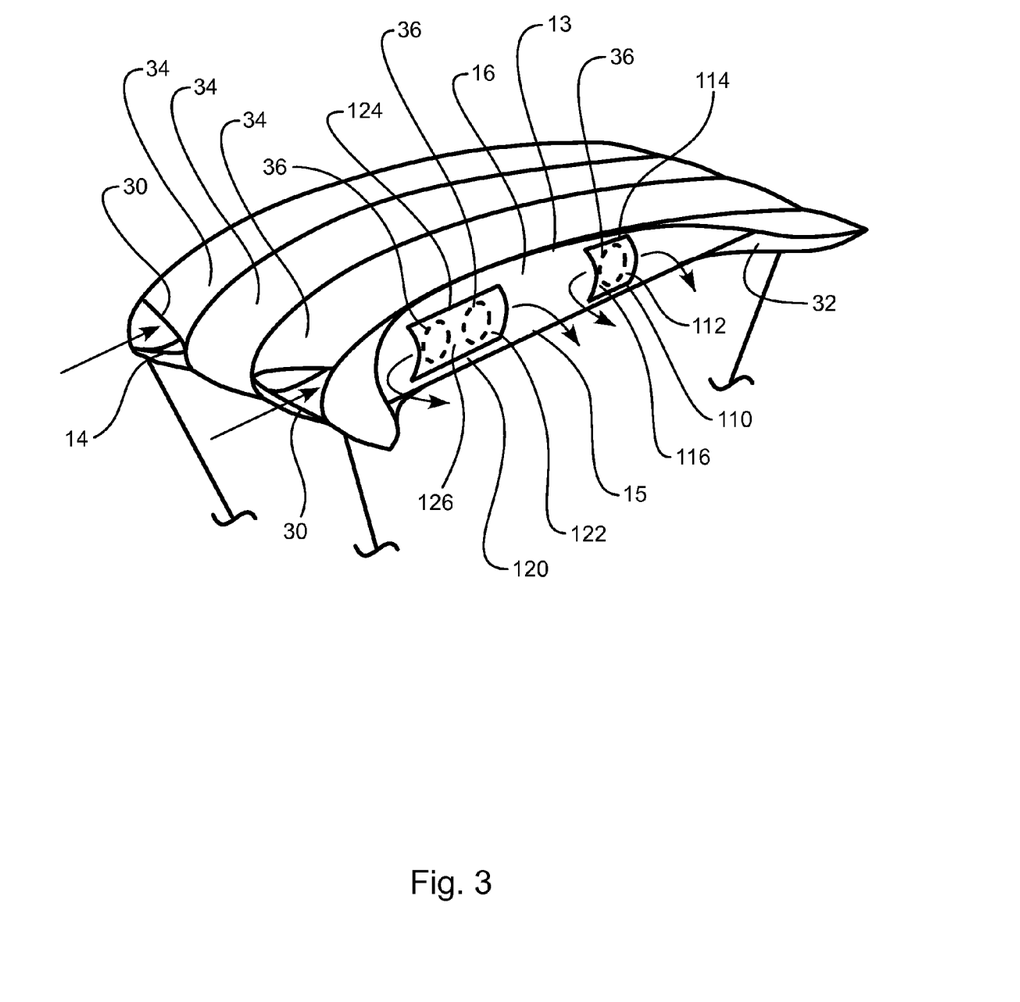
FIG. 3 is a front perspective cutaway view of the parachute flying in turbulent conditions with the crossport valves responding by closing to prevent loss of parachute rigidity or canopy collapse.

FIG. 3 shows a perspective partial cutaway view of the parachute 1 showing the one way valves 110, 120 positioned upon an internal rib 16. The rib 16 is attached at its upper edge 13 to the upper skin 12 and attached at its lower edge 15 to the lower skin 14. Air flow, represented by arrows, is shown entering the air inlets 30 on the leading edge of two outboard cells 34. The air pressure urges the valves 110, 120 into an open position, allowing the air to flow to the adjacent inboard cells 32. The valves 110, 120 in this embodiment are comprised of panels 112 and 122 of low porosity or zero porosity fabric. The upper edges 114, 124 and lower edges 116, 126 are joined to the rib 16 by any appropriate means, including sewing, bonding, or gluing.

Figure 4:
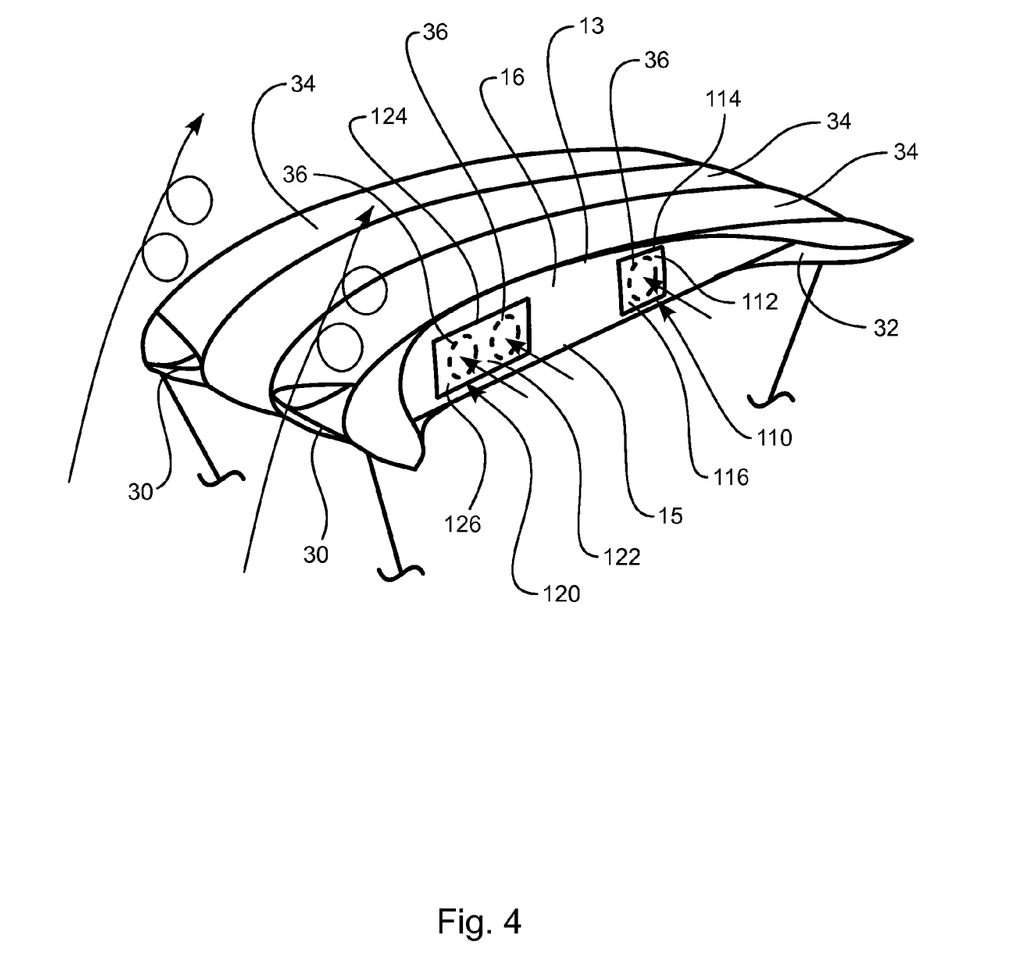
FIG. 4 is a front perspective cutaway view of the crossport valves in the open position.

FIG. 4 shows a perspective partial cutaway view of the parachute 1 under slow speed or turbulent wind conditions. Inadequate air flow against the air inlets 30 results in lower air pressure in the outboard cells 34. When air pressure is lower in the outboard cells 34 containing the air inlets 30 than the air pressure in the inboard cells 32, the air pressure urges the panels 112, 122 against the rib 16, closing the valves 110, 120 and slowing or stopping the loss of air from the inboard parachute cells 34 to the outboard cells 34. Airflow through the crossports 36 is stopped and parachute rigidity and shape is generally maintained.

Figure 5:
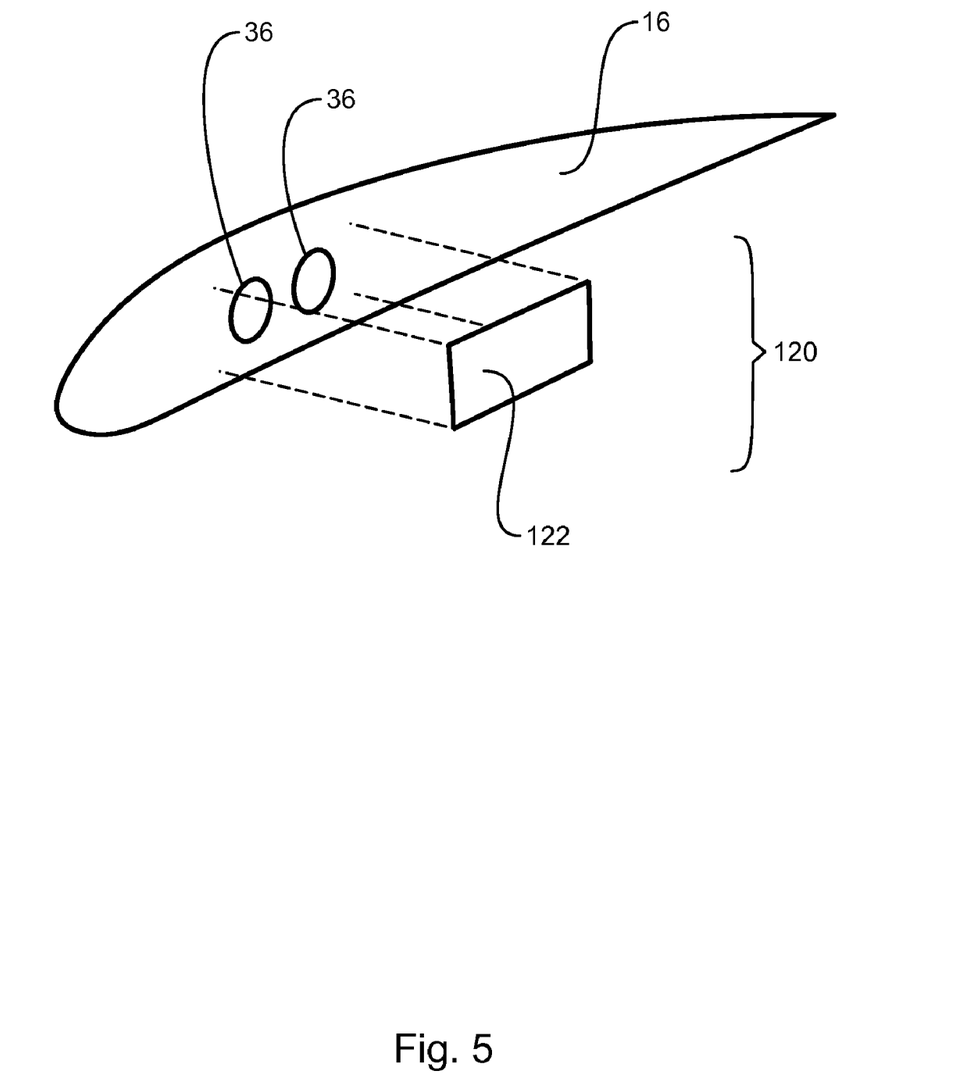
FIG. 5 is an exploded perspective view of the valve mechanism.

FIG. 5 shows an exploded perspective view of the preferred embodiment of the valve 120. In this embodiment a flexible valve panel 122 is attached, generally at its edges, to the rib 16 of the parachute. The valve panel 122 is preferably constructed from zero porosity parachute fabric. Zero porosity fabric is generally a tightly woven synthetic, such as rip stop nylon possessing a coating that seals the small gaps between the individual fibers of the fabric. While zero porosity fabric is preferred, other type of material, including low porosity fabric may also be used.

Figure 6:
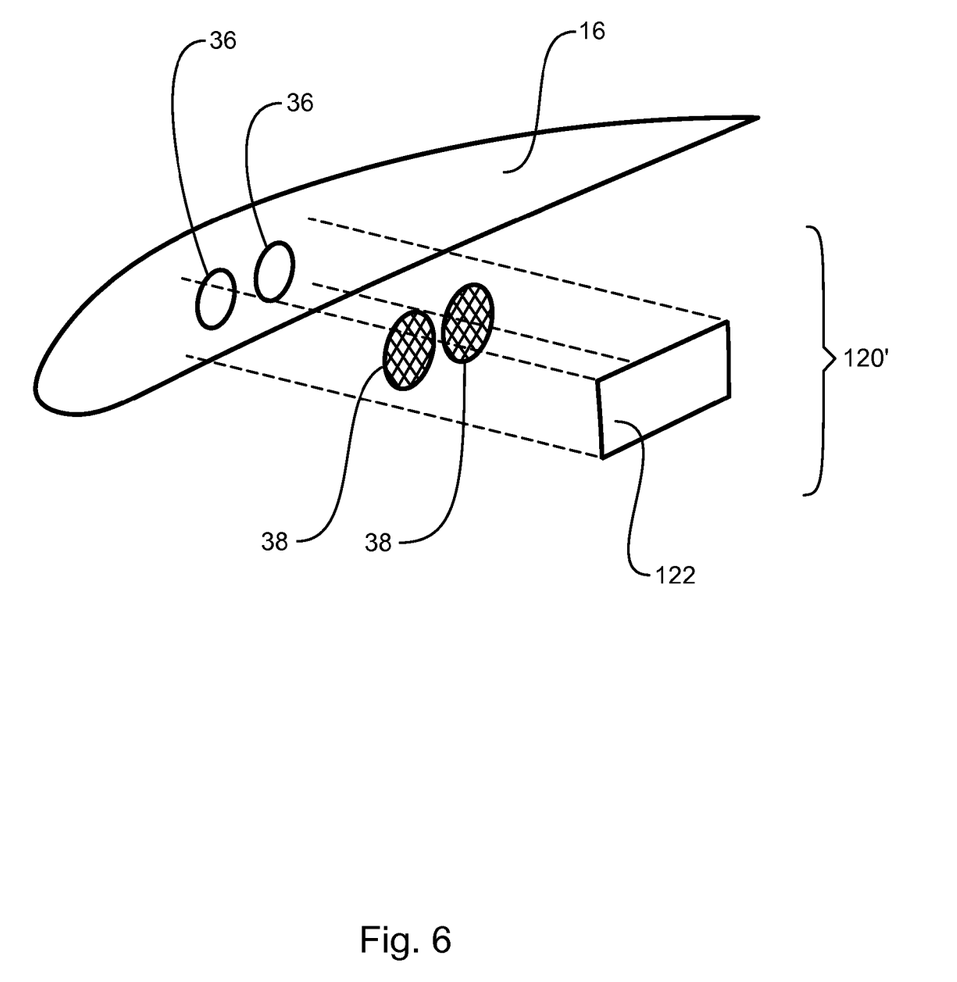
FIG. 6 is an exploded perspective view of the valve mechanism with mesh material.

FIG. 6 shows an exploded perspective view of another embodiment of the valve 120'. In this embodiment, an air permeable mesh material 38 is attached to the rib 16 over each of the crossports 36 of the valve 120'. A flexible valve panel 122 is attached to the rib material. The mesh 38 prevents the valve panel 122 from being pushed through the crossports 36 when the air exerts pressure on the valve 120' and the valve panel 122 seals the crossports 36. The additional mesh material 38 allows a greater amount of the valve panel 122 to be free from attachment to the rib 16 allowing greater airflow through the crossport 36 when the valve 122' is open.

Figure 7A:
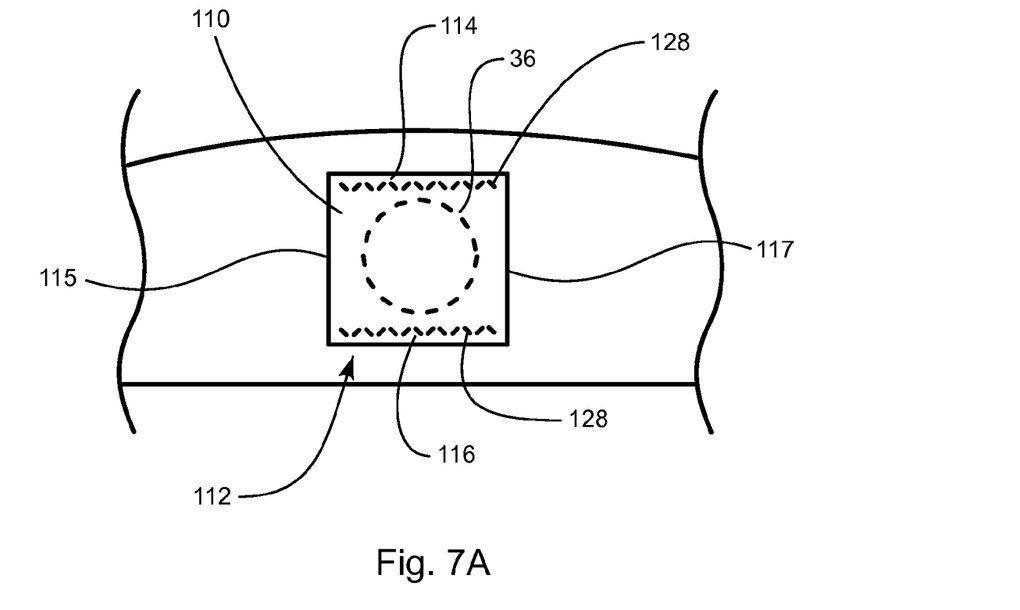
FIG. 7A is a side view of a rib and valve mechanism showing one embodiment of valve panel attachment.

FIG. 7A shows the preferred attachment of the valve panel 110. Here the valve panel 110 is affixed at its upper edge 114 and lower edge 116 to the rib 16 of the parachute 1 over a single crossport 36. The left edge 115 and right edge 117 of the panel remains unattached to allow airflow between the rib 16 and the valve panel 110 when air urges the valve panel 110 in the open position. When airflow is reversed, the air pressure presses the valve panel 110 against the rib 16 in a sealing relationship closing the valve 112 and maintaining the rigidity and shape of the parachute. In the preferred embodiment the panel 110 is attached by a row of stitching 128. Other attachment methods may be used, including bonding or gluing the valve panel 110 to the rib 16.

Figure 7B:
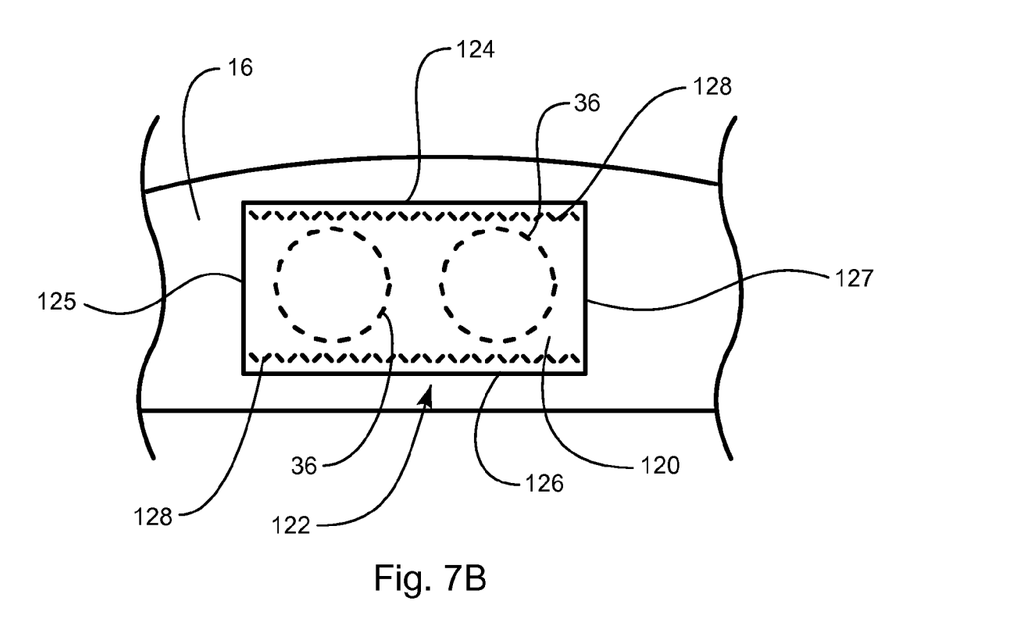
FIG. 7B is a side view of a rib and valve mechanism showing another embodiment of valve panel attachment.

FIG. 7B shows another embodiment of the preferred attachment of the valve panel 120. Here multiple crossports 36 are covered by a single valve panel 120. The attachment of the valve panel at its top edge 124 and bottom edge 126 allows air to flow through the crossport 36 and past the left edge 125 and right edge 127 to inflate the parachute.

Figure 7C:
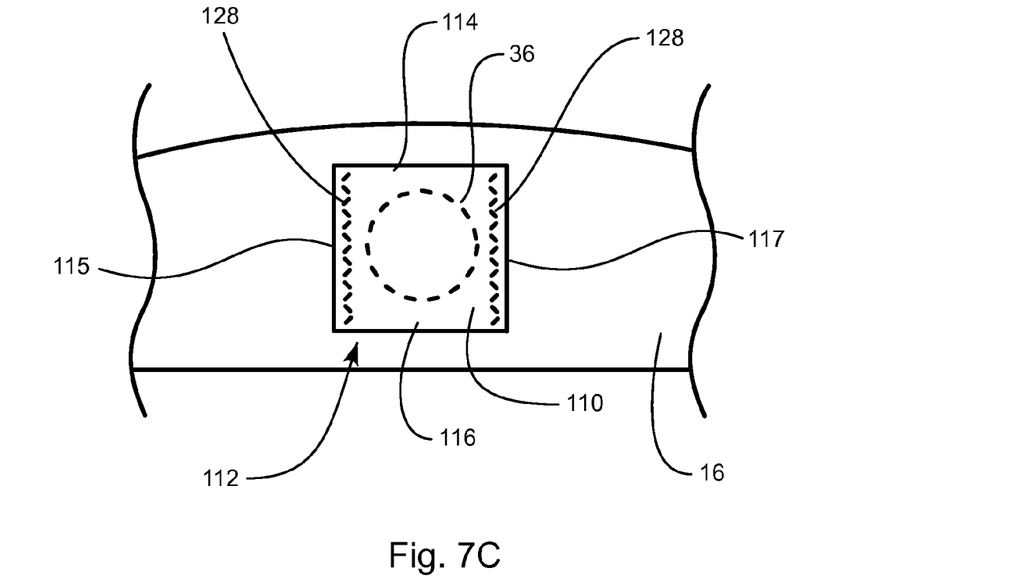
FIG. 7C is a side view of a rib and valve mechanism showing another embodiment of valve panel attachment.

FIG. 7C shows yet another embodiment of invention where the valve panel 110 is attached to the rib 16 at the valve panel's left edge 115 and right edge 117 by a row of stitching 128 over a single crossport 36. Here, air will flow through the crossport 36 and past the upper edge 114 and lower edge 116 of the valve panel 110 when the valve 110 is in the open position. As with the previous embodiments, when airflow is reversed, the valve 112 will close preventing the air to flow past the crossport 36 and out of the parachute 1.

Figure 7D:
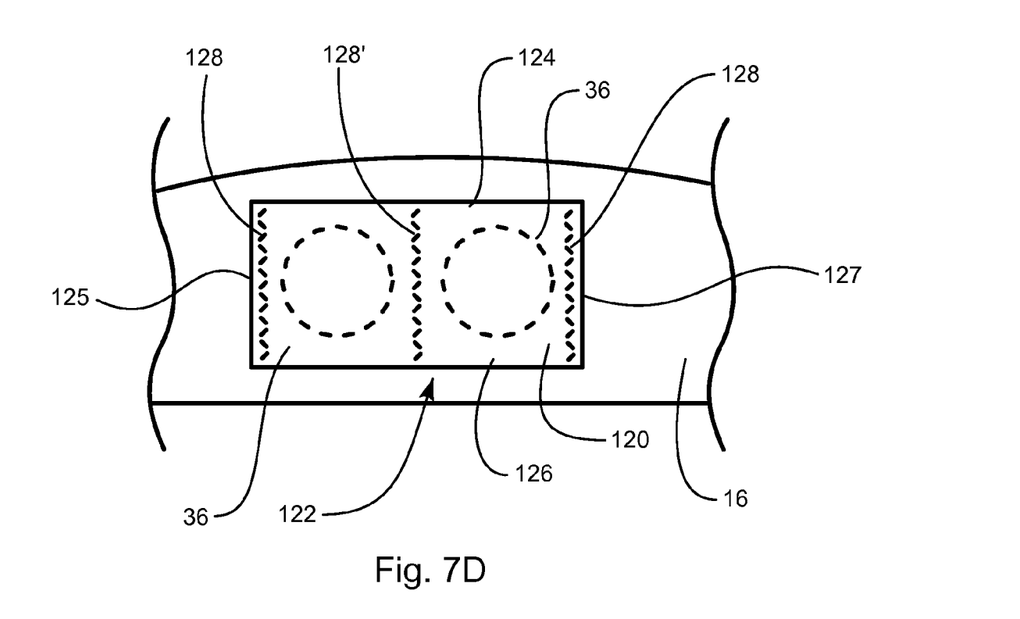
FIG. 7D is a side view of a rib and valve mechanism showing another embodiment of valve panel attachment.

FIG. 7D shows yet another embodiment of the invention where the valve panel 120 is attached to the rib 16 over multiple crossports 36. In this embodiment the upper edge 124 and lower edge 126 of the valve panel 120 remain unattached. A vertical row of stitching 128 at the left edge 125 and a vertical row of stitching 128 at the right edge 127 secure the valve panel 120 to the rib 16. In this embodiment an optional additional vertical row of stitching 128' between the crossports 36 provides additional attachment support of the valve panel 120 to the rib 16.

Figure 8:
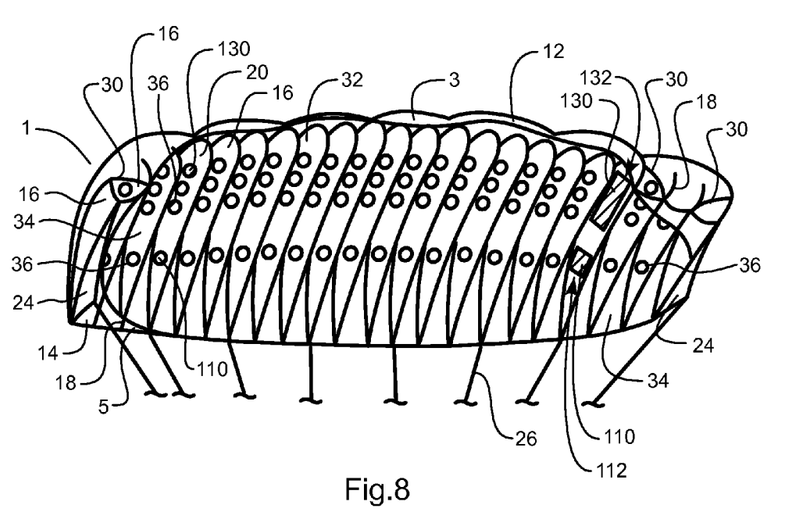
FIG. 8 is a front perspective cutaway view of the invention showing the internal rib bracing, crossports and outboards positioned crossport valves.

FIG. 8 shows a perspective cutaway view of the preferred embodiment of the parachute 1 showing the elongated ribs 16 crossports 36 and valve panels 110 and 130. In the preferred embodiment shown here, the valves 112 and 132 are positioned on a rib 16 inboard from the outboard positioned air inlets 30. Air enters an air inlet 30 flowing through the crossports urging the valve panel 110 and 130 open. The air flows though the valve 112 and 132 and into the inboard cells 32 of the parachute 1 where it inflates and pressurizes the interior of the parachute 1, giving the parachute 1 its shape and size. The valves 112 and 132 prevent air from escaping from the inboard cells 32 to the outboard cells 34 and out of the parachute 1 through the air inlets 30. When the air pressure is less in the outboard cells 34 than in the inboard cells 32, the valves 112 and 132 seal the crossports 36 on the outboard positioned ribs 16 preventing depressurization of the parachute. While in the preferred embodiment the valves 112 and 132 are positioned on load bearing ribs 20, the valves 112 and 132 may be positioned on non load bearing ribs. While this embodiment depicts two valves positioned on the same rib, one valve panel 130 covering three crossports 36 and another valve panel 110 covering a single crossport 36, it should be understood than any desired number of valves may be positioned upon an individual rib 16, each valve panel covering any desired number of cross ports 36.

Figure 9:
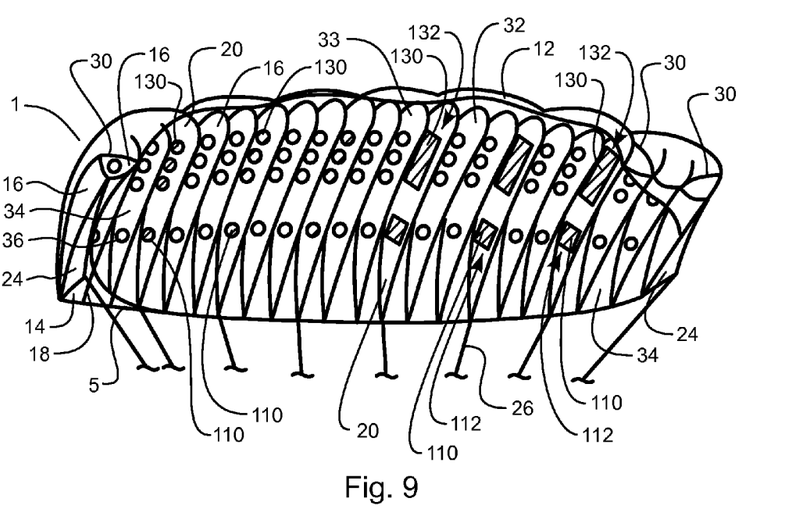
FIG. 9 is a front perspective cutaway view of the invention showing the internal rib bracing, crossports and crossport valves positioned between each parachute cell.

FIG. 9 shows a perspective cutaway view of another embodiment of the parachute 1 showing the elongated ribs 16 crossports 36 and valve panels 120. In this embodiment each of the load bearing ribs 20 possess valves 122 covering the crossports 36. Each of the valves allow air to travel from the outboard cells 34 of the parachute to the center cells 33 of the parachute. The valves 122 prevent air from escaping through the crossports 36 when air pressure in the outboard cells 34 is less than the inboard cells 32. Having valves positioned on multiple ribs provides additional redundant safety to ensure proper inflation of the parachute during flight.

Figure 10:
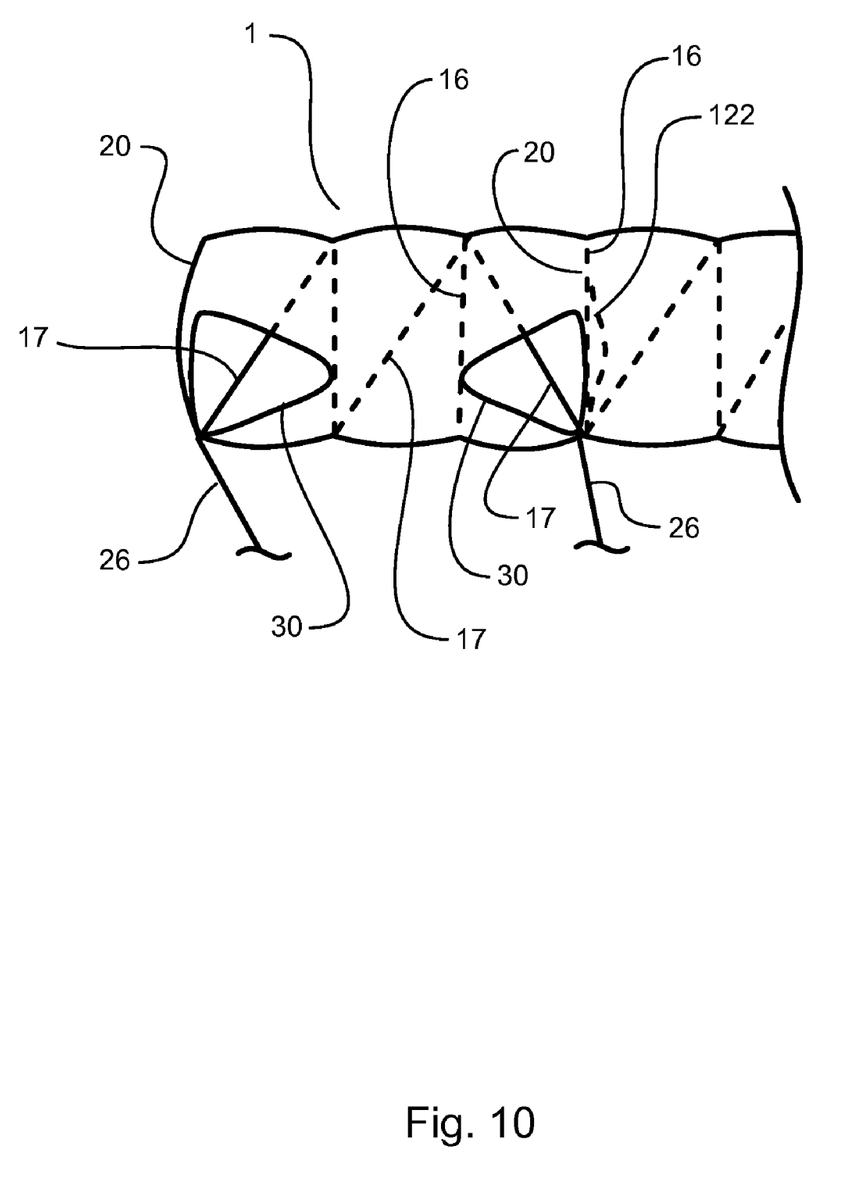
FIG. 10 is a front view of the leading edge of the parachute showing the air inlets and internal cross bracing.

FIG. 10 shows a partial front view of the leading edge 3 of the outboard section parachute 1. Cross braces 17 are attached diagonally from the bottom of one rib to the top of an adjacent rib. These cross braces 17 provide additional support for the parachute 1 when in flight and under load by supporting the portion of the parachute 1 between the load bearing ribs 20. Positioning of the valve 122 on the internal ribs 16 of the parachute allows for use of valves 122 to maintain the parachute 1 shape during turbulent or slow speed conditions and allows for use of cross braces 17. The cross braces 17 are constructed from any suitable lightweight fabric. The cross braces 17 are constructed in a manner that allows airflow through each cell to each adjacent cell. Such cross braces may be constructed so as to not extend the full length of the rib, possess openings, and/or are constructed of a porous material.

What is claimed is:

1. A ram-air inflatable wing comprising:
    an upper skin having a leading edge, trailing edge and a pair of generally opposing lateral edges;
    a lower skin having a leading edge, trailing edge and a pair of generally opposing lateral edges;
    a plurality of elongated ribs, each having an upper edge and a lower edge, each pair of adjacent said ribs being spaced apart a predetermined distance, with at least a portion of said upper edge being affixed to said upper skin and at least a portion of said lower edge being affixed to said lower skin;
    a plurality of elongated cells, each cell defined by said upper skin, said lower skin and a pair of adjacent said ribs, each of said cell having at least one crossport allowing air flow in at least one direction from one cell to an adjacent cell;
    at least one rib of a first cell having at least one valve, each valve comprising a panel of flexible material partially attached on opposing sides of said crossport, said attachment spanning at least the width of said crossport, and to one side of said rib, at least a portion of said panel remaining free such that said free portion of said panel is urged into a sealing position against said rib when air pressure is lower in said first cell compared to the pressure in said second cell and urged to an open position when air pressure is higher in said first cell compared to the pressure in said second cell, whereby said second cell remains substantially inflated when air pressure inside said second cell is greater than the air pressure in said first cell thereby inhibiting deformation of said inflatable wing; and
    at least one air inlet positioned on said wing's leading edge whereby air flows into said inlet inflating said cells of said wing.

2. The inflatable ram air wing of claim 1 wherein at least one said air inlet is positioned on said outboard cells of said wing whereby one or more of said valves allow air to flow to said inboard cells of said parachute, but resist airflow from said inboard cells of said parachute to said outboard cells.

3. The inflatable ram air wing of claim 1 wherein at least one said air inlet is positioned on the central inboard cells of said wing whereby one or more of said valves allow air to flow from said inboard cells to said outboard cells of said parachute, but resist airflow from said outboard cells of said parachute to said inboard cells.

4. The inflatable ram air wing of claim 1 further comprising a plurality of suspension lines attached to said lower edge of a plurality of said ribs with at least two said cells positioned between an adjacent pair of said suspension lines.

5. The inflatable ram air wing of claim 4 further comprising a plurality of internal cross brace panels each attaching at said bottom edge of said rib attached to said suspension line and at said top edge of said adjacent rib.

6. The inflatable ram air wing of claim 1 further comprising a plurality of suspension lines attached to said lower edge of a plurality of said ribs with at least three said cells positioned between an adjacent pair of said suspension lines.

7. The inflatable ram air wing of claim 6 further comprising a plurality of internal cross brace panels each attaching at said bottom edge of said rib attached to said suspension line and at said top edge of said adjacent rib.

8. The inflatable ram air wing of claim 6 wherein the third of said plurality of cells from each end of said wing possesses said valve containing rib and at least one cell of the three cells closest to each said lateral opposing edges contain said air inlet.

9. The inflatable ram air wing of claim 7 possessing four air inlets wherein the first and third of said plurality of cells from each of said laterally opposing edges each possess one said air inlet.

10. An inflatable ram air wing comprising:
    an upper skin and a lower skin constructed from a flexible material having a leading edge, a trailing edge, a first side edge and a second side edge, the upper and lower skin being joined along their edges for form an envelope having a leading edge, a trailing edge, a first side edge and second side edge;
    a plurality of elongated ribs constructed from a flexible material disposed between said upper and lower skins, each rib having a top edge and a bottom edge;
    a plurality of cells within said envelope, each cell defined by a portion of said upper skin forming the top of said cells, a portion of said lower skin forming the bottom of said cell, a pair of adjacent ribs forming the first and second side walls of said cell, said cells proximal to said side edges forming outboard cells, and said cells disposed proximal to the center of said parachute forming inboard cells;

at least one air inlet positioned at the leading edge of said envelope;

at least one inter-envelope opening between each of said plurality of cells allowing air to flow between adjacent cells; and at least one of said ribs possessing said inter-envelope opening also possessing a valve placed over and attached on opposing sides of said inter-envelope opening, said attachment spanning at least the width of said inter-envelope opening, said valve urged open in one direction allowing air flow in one direction, yet urged into a sealing configuration against said rib to prevent airflow in the opposite direction.

11. The inflatable ram air wing of claim 10 wherein each valve is comprised of a panel of flexible material partially attached to a first side of said rib, said rib disposed between a first cell on said first side of said rib and a second cell on a second side of said rib, at least a portion of said panel remaining free such that said free portion of said panel is urged into a sealing position when air pressure is higher in said first cell compared to the pressure in said second cell and urged to an open position when air pressure is lower in said first cell compared to the pressure in said second cell, whereby said first cell remains substantially inflated when air pressure inside said second cell is greater than the air pressure in said first cell inhibiting deformation of said inflatable wing.

12. The inflatable ram air wing of claim 11 wherein each said valve is further comprised of a panel of breathable mesh material forming a surface to support said valve panel when airflow draws said valve panel closed, yet allow airflow through said mesh panel when airflow urges said panel into an open position.

13. The inflatable ram air wing of claim 10 wherein at least one said air inlet is positioned on at least one outboard cell of said wing whereby at least one of said valves allow air to flow to said inboard cells of said parachute, but resist airflow from said inboard cells of said parachute to said outboard cells.

14. The inflatable ram air wing of claim 10 wherein at least one said air inlet is positioned on at least one inboard cells of said wing whereby at least one of said valves allow air to flow from said inboard cells to said outboard cells of said parachute, but resist airflow from said outboard cells of said parachute to said inboard cells.

15. The inflatable ram air wing of claim 10 further comprising a plurality of suspension lines attached to said lower edge of a plurality of said ribs with at least two said cells positioned between an adjacent pair of said suspension lines.

16. The inflatable ram air wing of claim 15 further comprising a plurality of internal cross brace panels each attaching at said bottom edge of said rib attached to said suspension line and at said top edge of said adjacent rib.

17. The inflatable ram air wing of claim 10 further comprising a plurality of suspension lines attached to said lower edge of a plurality of said ribs with at least three said cells positioned between an adjacent pair of said suspension lines.

18. The inflatable ram air wing of claim 17 further comprising a plurality of internal cross brace panels each attaching at said bottom edge of said rib attached to said suspension line and at said top edge of said adjacent rib.

19. The inflatable ram air wing of claim 18 wherein the third of said plurality of cells from each side edge of said wing possesses said valve containing rib and at least one cell of the three cells closest to each side edge contains at least one said air inlet.

20. The inflatable ram air wing of claim 19 possessing four air inlets wherein the first and third of said plurality of cells from each of said side edges each possess one said air inlet.

21. An inflatable ram air wing comprising:

an upper skin and a lower skin constructed from a flexible material having a leading edge, a trailing edge, a first side edge and a second side edge, the upper and lower skin being joined along their edges for form an envelope having a leading edge and a trailing edge;

a plurality of elongated ribs constructed from a flexible material disposed between said upper and lower skins, each rib having a top edge and a bottom edge;

a plurality of cells within said envelope, each cell defined by a portion of said upper skin forming the top of said cells, a portion of said lower skin forming the bottom of said cell, a pair of adjacent ribs forming the first and second side walls of said cell, said cells proximal to said side edges forming outboard cells, and said cells disposed proximal to the center of said parachute forming inboard cells;

an air inlet positioned at the leading edge of said first and third of said plurality of cells from each of said side edges;

at least one inter-envelope opening between each of said plurality of cells allowing air to flow between adjacent cells;

at least one of said ribs possessing said inter-envelope opening also possessing a valve comprised of a panel of flexible material partially attached to one side of said rib over said inter-envelope opening and affixed on opposing sides of said opening said attachment spanning at least the width of said inter-envelope opening, said valve urged open in one direction allowing air flow in one direction, yet urged into a sealing configuration against said rib to prevent airflow in the opposite direction;

a plurality of suspension lines attached to said lower edge of a plurality of said ribs with at least three said cells positioned between an adjacent pair of said suspension lines; and a plurality of internal cross brace panels each attaching at said bottom edge of said rib attached to said suspension line and at said top edge of one of said adjacent ribs.

* * * * *